United States Patent
Schepperle et al.

(10) Patent No.: US 7,798,032 B2
(45) Date of Patent: Sep. 21, 2010

(54) VEHICLE GEARBOX WITH AN INTEGRATED ELECTRIC MOTOR

(75) Inventors: Bernd Schepperle, Contance (DE); Hubert Remmlinger, Friedrichshafen (DE); Karl-Hermann Ketteler, Markdorf (DE); Kai Heinrich, Waldburg (DE); Peter Feulner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 627 days.

(21) Appl. No.: 11/813,775

(22) PCT Filed: Dec. 2, 2005

(86) PCT No.: PCT/EP2005/012875

§ 371 (c)(1),
(2), (4) Date: Jul. 12, 2007

(87) PCT Pub. No.: WO2006/074756

PCT Pub. Date: Jul. 20, 2006

(65) Prior Publication Data

US 2008/0129230 A1    Jun. 5, 2008

(30) Foreign Application Priority Data

Jan. 13, 2005    (DE) .................. 10 2005 001 525

(51) Int. Cl.
*F16H 61/32* (2006.01)
(52) U.S. Cl. ........................ 74/335; 74/606 R
(58) Field of Classification Search ............... 74/665 F, 74/665 G
See application file for complete search history.

(56) References Cited

U.S. PATENT DOCUMENTS

| 5,423,235 | A | 6/1995 | Botterill et al. |
| 7,021,441 | B2 | 4/2006 | Granzow et al. |
| 7,215,115 | B2 | 5/2007 | Saito et al. |
| 2004/0147355 | A1 | 7/2004 | Grundl et al. |
| 2004/0163921 | A1* | 8/2004 | Granzow et al. ........... 192/84.6 |

FOREIGN PATENT DOCUMENTS

| DE | 1 764 029 | 4/1971 |
| DE | 41 05 157 | 1/1992 |
| DE | 198 38 660 | 3/2000 |
| DE | 101 13 300 | 10/2002 |
| DE | 103 44 106 | 4/2004 |
| DE | 103 07 017 | 9/2004 |
| EP | 1 191 260 | 3/2002 |
| EP | 1 323 956 | 12/2002 |

* cited by examiner

*Primary Examiner*—Sherry L Estremsky
*Assistant Examiner*—Edwin A. Young
(74) *Attorney, Agent, or Firm*—Davis & Bujold, P.L.L.C.

(57) ABSTRACT

An electromechanically activated motor vehicle transmission (31, 14) such as an automated manual transmission (31) or a transfer case (14). This transmission includes at least a transmission housing (11), an electromagnetic selecting or shifting device (1) and an electric motor (2, 8, 22) by which the selecting or shifting device (1) can be actuated. In the inventive motor vehicle transmission (31, 14), the electric motor (2, 8, 22) of the selecting or shifting mechanism (1) arranged within the transmission housing (11) and the motor housing (9, 12, 24) of the electric motor (2, 8, 22) is designed so that it corresponds to a portion of the transmission housing (11).

13 Claims, 3 Drawing Sheets

VEHICLE GEARBOX WITH AN INTEGRATED ELECTRIC MOTOR

This application is a national stage completion of PCT/EP2005/012875 filed Dec. 2, 2005 which claims priority from German Application Serial No. 10 2005 001 525.5 filed Jan. 13, 2005.

FIELD OF THE INVENTION

The invention concerns an electromechanically actuated motor vehicle transmission, such as an automated manual transmission or a transfer case for example. Transmissions of this type usually have shifting devices that are actuated by means of an electric motor.

BACKGROUND OF THE INVENTION

In automated or automatic manual transmissions, these electric motors are usually attached to the outside of the transmission housing. A transmission of this type is known from DE 103 44 106 A1, for example. That particular publication describes an electric motor that is screwed onto the outside of the transmission housing. The electric motor drives a gear that engages a shifting shaft through an opening in the wall of the transmission housing. In this type of arrangement, the engaging surface must naturally be painstakingly sealed. The sealing site is also the mechanical interface between the electric motor and the transmission housing, since the motor is attached to the transmission housing at this location by screw connections. When interfaces have multiple functions as described above, it is technically very difficult to ensure that all functions perform satisfactorily. Furthermore, it must be taken into consideration that the electric motor, attached to the outside of the transmission housing, constitutes a vibratable component that can be damaged by excessive resonance resulting from vibrational excitation generated by the transmission. Because of its exposed location, the electric motor is naturally subjected to strong temperature fluctuations. Through its own heat and the additional heat from the transmission, it can reach a temperature that considerably exceeds the temperature of the surrounding medium such as spray water, for example. Quenching with the surrounding medium causes pressure differences to appear at the sealing surface, which in turn increase the stress placed on the interface seal.

DE 103 07 017 A1 also discloses an electromechanically actuated transfer case in which an electric motor actuates a clutch device, via a drive converter device.

In that system, a first output shaft is directly connected to a drive shaft. A second output shaft can be connected to the drive, via a clutch device.

The clutch device can be actuated by the electric motor, while arranged between the clutch device and the electric motor is a device via which a rotational movement of the electric motor is transformed into a translatory actuation movement for controlling the clutch device.

The electric motor, in this example, is equipped with a motor housing and is installed in the transmission housing completely preassembled. The separate motor housing of the electric motor is nonrotatably attached to the transmission housing. The installation of a separate motor housing also involves a mechanical interface that is technically difficult to realize. This results in a weak spot that can make the product more prone to defects.

SUMMARY OF THE INVENTION

The object of the invention is to create an electromechanically shiftable motor vehicle transmission that is equipped with a shifting device actuated by an electric motor. At the same time, the interface between the electric motor and the transmission should be designed to be as economical, robust and unsusceptible to defects as possible.

Accordingly, the invention proceeds from an electromechanically actuatable motor vehicle transmission, such as an automatic or automated manual transmission or a transfer case. The transmission features at least a transmission housing, an electromagnetic shifting device and an electric motor for driving the shifting device. According to the invention, the motor housing of the electric motor is designed so that it corresponds to a portion of the transmission housing and the electric motor is located inside the transmission housing.

In an advantageous embodiment of the invention, the motor housing of at least one electric motor is designed so that it forms a portion of the transmission housing, which can be assembled separately. In this embodiment, the motor housing of the electric motor contains all individual components of the electric motor. The fully assembled electric motor is installed in the transmission housing in this way. At the same time, a portion of the motor housing serves as a transmission cover for closing the transmission housing. The transmission cover corresponds to a portion of the outerwall of the transmission housing. The electric motor is advantageously located inside the transmission housing. In this way, the electric motor can be supported by the transmission housing on an especially broad surface area, thereby reducing the mechanical stress on the interface, Because the motor does not protrude through the housing, excessive resonance does not result when the transmission generates vibrational excitations. Integrating the electric motor into the transmission housing results in improved heat dissipation for the electric motor.

In another embodiment, the motor housing is designed as one piece with the transmission housing and is also arranged within the transmission housing. As a result, the electric motor does not require a separate motor housing. Instead, a portion of the transmission housing serves as motor housing and thus contains the individual components of the electric motor. The electric motor is therefore not assembled before being installed in the transmission. Rather, the individual components of the electric motor are assembled to form a functioning electric motor only during the process of being installed in the transmission housing. In another embodiment, a part of such an electric motor can be closed with a cover.

A three-phase AC motor, for example an asynchronous motor, is preferably used as electric motor. Asynchronous motors can advantageously also be operated open in an oil-filled space. Having the electric motor rinsed with oil significantly improves cooling. The motor housing of the electric motor is therefore designed as partly open in another embodiment.

BRIEF DESCRIPTION OF THE DRAWINGS

The invention is explained in greater detail through an embodiment with a description of the drawings. Included in the drawings.

DETAILED DESCRIPTION OF THE INVENTION

Figure 1:
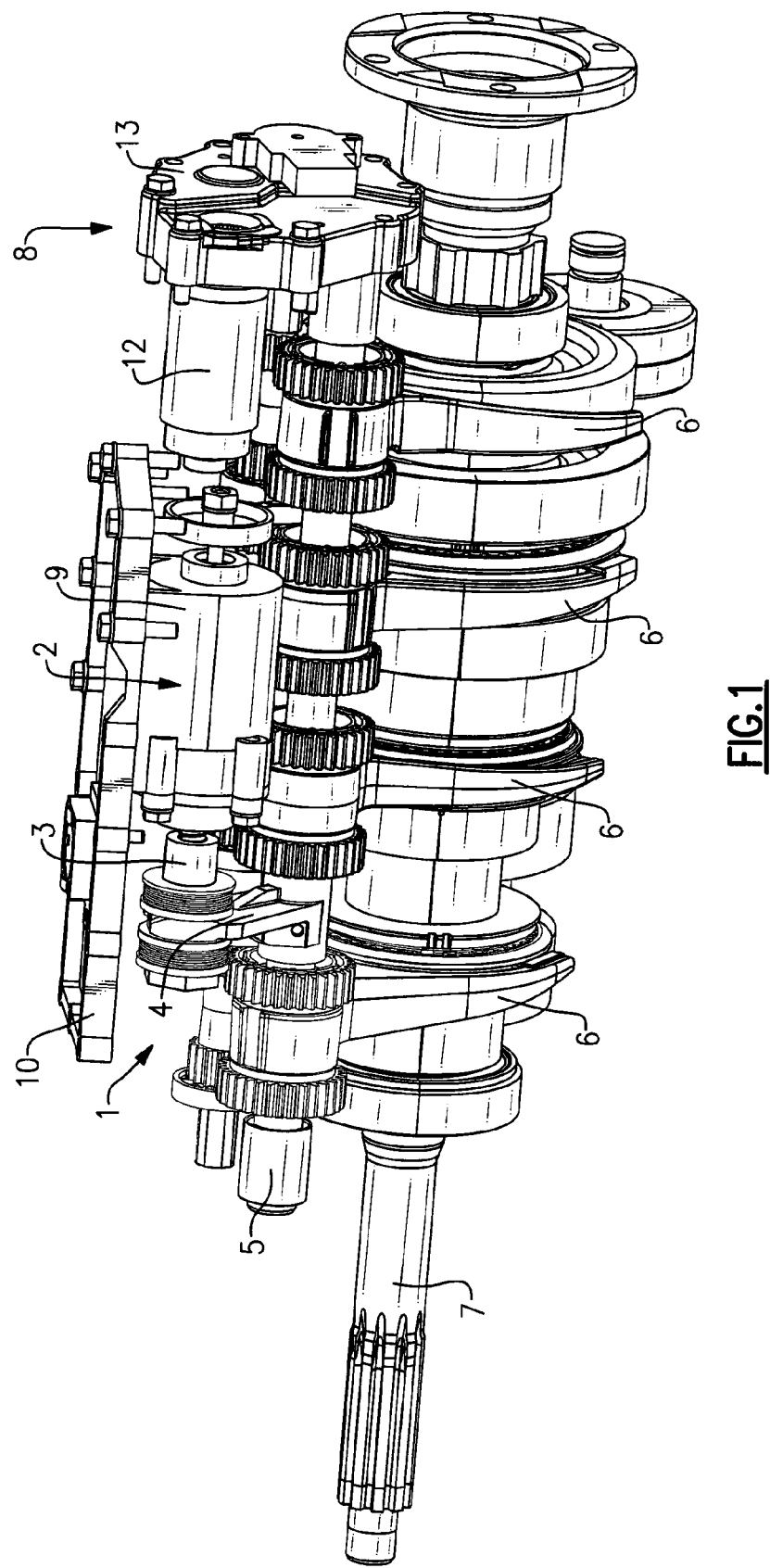
FIG. 1 as a mechanical drawing of the invention.

FIG. 1 is a mechanical drawing of an inventive transmission. An electromechanical shifting mechanism 1 is composed of an electric motor 2, a motor shaft 3 and a transfer element 4. The electric motor 2 is connected to the selector shaft 5, via the motor shaft 3, and the transfer element 4. Connected to the selector shaft 5 are other transmission members, by means of which a previously selected gear ratio can be engaged on a transmission shaft 7. The desired gear ratios are selected, via a selector motor 8.

The electric motor 2 features a first motor housing 9, which is formed as one piece with a first transmission cover 10. The first transmission cover 10 can be connected to a transmission housing 11, illustrated in FIG. 2, and forms a portion of the outer wall of the transmission housing 11. The individual components of the electric motor 2 are installed in the motor housing 9 before being installed in the transmission housing 11. The motor shaft 3 of the electric motor 2 features a thread of a ball spindle, by means of which the transfer element 4 is directly displaced from the electric motor 2, axially. The axial movement of the transfer element 4 causes the selector shaft 5 to move in the axial direction. Connected to the selector shaft 5 are other transfer elements 6, by means of which previously selected gear ratios can be engaged on a transmission shaft 7. The gear ratios are selected by a second electric motor, the selector motor 8.

The selector motor 8 features a second motor housing 12, which also constitutes a portion of the transmission housing 11, but which is formed as one piece with the transmission housing 11. The individual components of the selector motor 8 are installed directly in the second motor housing 12. The selector motor 8 becomes a functional drive only through the process of assembling the individual components in the second motor housing 12. The transmission housing 11 is closed with a second transmission cover 13 following the assembly of the individual components.

Figure 2:
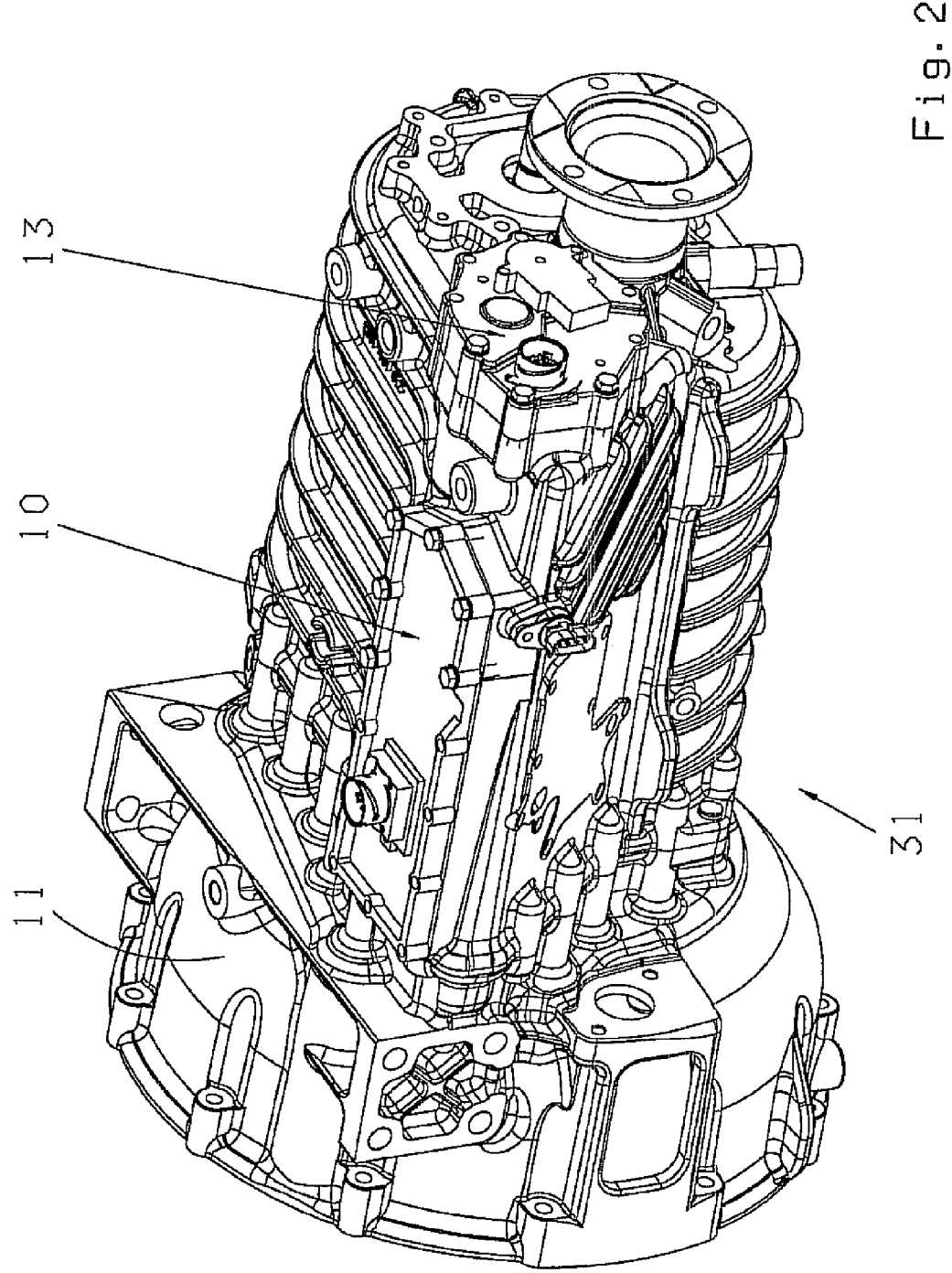
FIG. 2 as another mechanical drawing of the invention.

FIG. 2 illustrates a closed transmission housing 11, where the first and second transmission cover 10, 13 are shown in assembled state. With the first transmission cover 10, it is clear that extensive support is present. This is made possible by the one-piece construction of the motor housing 9 and the cover 10. As a result of this feature, stress on the mechanical interface and the sealing surface between electric motor 2 and the transmission housing 11 is greatly reduced. The second transmission cover 13 primarily provides a sealing function. The demand on the second transmission cover 13 is thus related to providing a seal against the outside environment.

Because of the decreased demands, the interfaces and sealing sites described above can be realized more simply and economically. Furthermore, the inventive incorporation of the motors 2, 8 into the transmission housing 11 increases the heat capacity of the surrounding environment of the electric motors 2, 8. As a result, the temperature gradients drop when the transmission cover 10, 13 is sprayed with water. Altogether, incorporating the electric motor 2, 8 into the transmission housing allows the best possible dissipation of the heat of the motors 2, 8.

Figure 3:
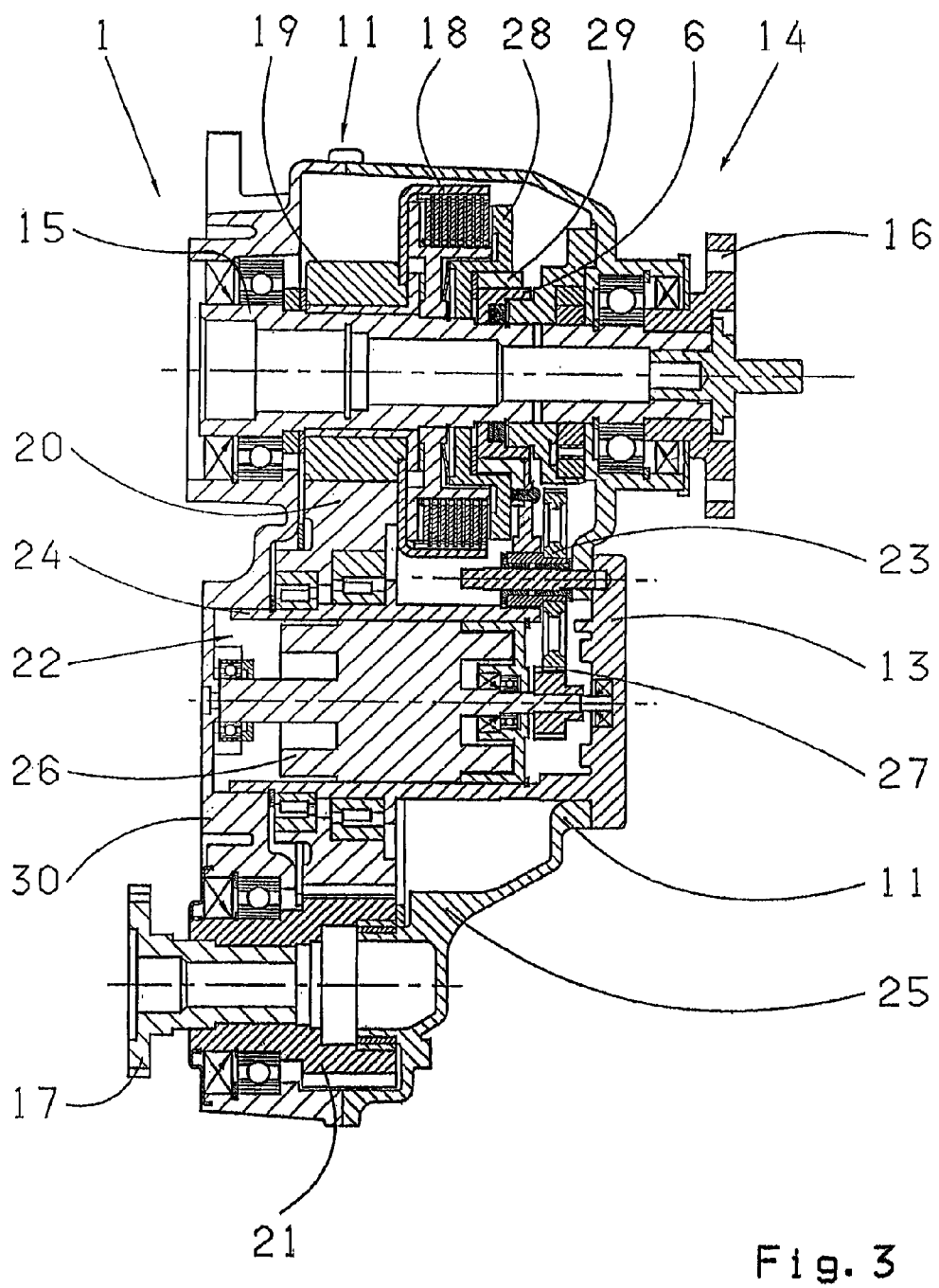
FIG. 3 as another embodiment of the invention.

FIG. 3 represents another illustration of an inventive solution. It shows a partial sectional view of a transfer case 14 with a third transfer element 23, a third electric motor 22 and a clutch device 18 for engaging a second output shaft. In this example, the third electric motor 22 and the third transfer element 23 combine to form a shifting mechanism 1.

FIG. 3 is a longitudinal section of a motor vehicle transfer case 14 designed as a longitudinal transfer case, by means of which drive torque generated, via a drive shaft 15, can be routed to two output shafts, where the only parts of the two output shafts illustrated are the two connection flanges 16, 17 to which the output shafts are coupled. In the description of the mode of function of the transfer case 14, the two connection flanges 16, 17 are equated with the output shafts, so the reference numbers of the two connection flanges are used for the two output shafts, which are not illustrated.

The first output shaft 16 is directly connected to the first drive shaft 15, so that the drive torque is directly transferred from the first drive shaft 15, to the first output shaft 16. The second output shaft 17 is connected to the drive shaft 15 via a clutch device 18, a first gear 19 mounted on the drive shaft 15, an intermediate gear 20 and a second gear 21, when the clutch device 18 is in a state in which torque can be transmitted, via the clutch device 18.

The clutch device 18 can be actuated via the third electric motor 22, while arranged between the clutch device 18 and the third electric motor 22 is a third transfer element 23 via which the rotational movement of the third electric motor 22 is converted into a translatory actuation movement for controlling the clutch device 18. A third motor housing 24 of the third electric motor 22 is formed as one piece with the first part 25 of the transmission housing 11. According to the invention, the individual components of the third electric motor 22, such as the rotor 26 for example, are installed in the motor housing 24 before the two halves 25, 30 of the transmission housing 11 are put together.

The third transfer element 23 features a gear ratio stage 27, which in this example is designed as spur gear stage. The clutch device 18 is designed with a pressure disc 28, which is attached in a rotationally fixed manner to the drive shaft 15 and is thus rotated at the same rotational speed as the drive shaft 15, when the transfer case 14 is operated. A ball screw nut 29 of the transmission device 23 is moved in the direction of the pressure disc 28, i.e. in the axial direction of the drive shaft 15, when the clutch device 18 is engaged so that frictional forces between the pressure disc 28 and the ball screw nut 29 increased as the adjustment travel of the ball screw nut 29 increases, thereby allowing torque to be transmitted.

In this example, the intermediate gear 20 is mounted in a rotationally fixed manner on the third motor housing 24 of the third electric motor 22. The arrangement of the third electric motor 22 within the intermediate gear 20 represents an extremely compact and space-saving construction of the transfer case 14, resulting in a considerably smaller space requirement in a motor vehicle compared to electric motors arranged outside the housing of the transfer case.

If the electric motor 22 is advantageously configured as three-phase AC motor, it is possible to design the third electric motor 22 to be more compact than if the motor is as a DC-motor, since three-phase AC motors feature greater output than DC-motors of the same dimensions. Combining this feature with the previously described configuration in particular allows the electric motor 22 or the three-phase AC motor to be significantly more compact than a DC-motor of a known transfer case.

Furthermore, it is also possible to design all three motor housings 9, 12, 24 as partially open. In this way, the motor housing 9, 12, 24 can be rinsed with oil, if an asynchronous motor is employed as electric motor 2, 8, 22. This option facilitates optimal cooling of the electric motor.

It is also conceivable to construct the first motor housing 9 of the first electric motor 2 as one piece with the transmission housing 11, just as the second or third motor housing 12, 24 can also be constructed as one piece with a transmission cover 10.

REFERENCE NUMBERS

1. Shifting-/selecting device
2. First electric motor
3. Motor shaft
4. First transfer element
5. Shifting shaft
6. Second transfer element
7. Transmission shaft
8. Selector motor
9. First motor housing
10. First transmission cover
11. Transmission housing
12. Second motor housing
13. Second transmission cover
14. Transfer case
15. Drive shaft
16. First output shaft, connection flange
17. Second output shaft, connection flange
18. Clutch mechanism
19. First gear
20. Intermediate gear
21. Second gear
22. Third electric motor
23. Third transfer element
24. Third motor housing
25. First part of the transmission housing 11
26. Rotor
27. Gear ratio stage
28. Pressure disc
29. Ball screw nut
30. Second part of the transmission housing 11
31. Transmission

The invention claimed is:

1. An electromagnetically actuated motor vehicle transmission, the transmission comprising:
an input shaft and only one output shaft;
a plurality of gear ratios, each of the plurality of gear ratios being selectively engagable;
at least a transmission housing;
an electromagnetic shifting device being actuatable to selectively engage the plurality of gear ratios; and
an electric motor for actuating the electromagnetic shifting device, the electric motor (2, 8, 22) of the electromagnetic shifting device (1) is located within the transmission housing (11) and at least a portion of a motor housing (9, 12, 24) of the electric motor (2, 8, 22) forms a portion of the transmission housing (11) and seals an interior of the transmission housing (11) from an exterior of the transmission housing (11).

2. The motor vehicle transmission according to claim 1, wherein the motor housing (9) mates with a separately mountable transmission cover (10) that is secured to the transmission housing (11) to seal the interior of the transmission housing (11) from the exterior of the transmission housing (11).

3. The motor vehicle transmission according to claim 1, wherein the motor housing (12, 24) is integral with the transmission housing (11, 25).

4. The motor vehicle transmission according to claim 1, wherein the electric motor (2, 8, 22) is a three-phase AC asynchronous motor.

5. The motor vehicle transmission according to claim 4, wherein a portion of the motor housing (9, 12, 24) that is secured to the transmission housing (11) is at least partially open and is subject to a flow of transmission fluid such that the electric motor (2, 8, 22) is cooled.

6. The motor vehicle transmission according to claim 1, wherein the electric motor (2) includes a motor shaft (3) with a ball spindle that directly axially displaces a first transfer element (4) which, in turn, axially displaces a shifting shaft (5), at least one second transfer element (6) is fixed to the shifting shaft (5) such that when the shifting shaft is axially displaced, the second transfer element one of engages and disengages a gear ratio.

7. An electromagnetically actuated motor vehicle transmission in combination with a transfer case, the combination comprising:
a plurality of gear ratios, each of the plurality of gear ratios being selectively engagable;
at least a transmission housing;
an electromagnetic shifting device being actuatable to selectively engage the plurality of gear ratios; and
a first electric motor for actuating the electromagnetic shifting device, the first electric motor (2, 8, 22) being housed within a motor housing (9, 12, 24) and the motor housing (9, 12, 24) being housed within the transmission housing (11), at least a portion of the motor housing (9, 12, 24) of the first electric motor (2, 8, 22) forming a portion of the transmission housing (11); and
a transfer case (14) comprising a drive shaft (15), a controllable clutch device (18) being coupled to the drive shaft (15) for distributing drive torque from the drive shaft (15) to at least first and second output shafts (16, 17), the second output shaft (17) being connectable to the drive shaft (15) by engaging the clutch device (18), a second electric motor (22) communicates, via a transmission device (23), with the clutch device (18) to facilitate engagement of the clutch device (18), the transmission device (23) converting rotational movement of the second electric motor (22) into a translatory movement for engaging the clutch device (18), the second electrical motor (22) being housed within a second motor housing (24) and the second motor housing (24) forming another portion of the transmission housing (11).

8. An electromagnetically actuated motor vehicle transmission, the transmission comprising:
a transmission housing (11) which contains the transmission and comprises at least a first opening;
an electromagnetic shifting device; and
an electric motor for actuating the electromagnetic shifting device, the electric motor (2, 8, 22) being housed within a motor housing (9, 12, 24) that is located within and secured to the transmission housing (11) such that at least a portion of housing (9, 12, 24) of the electric motor (2, 8, 22) forms a portion of the transmission housing (11) and encloses the first opening in the transmission housing (11).

9. The motor vehicle transmission according to claim 8, wherein the electric motor for actuating the electromagnetic shifting device is a first electric motor (2), the transmission housing (11) comprises a second opening and a second electrical motor (8, 22), that is housed within a second motor housing (12, 24), is located within and secured to the transmission housing (11) such that the second motor housing (12, 24) encloses the second opening in the transmission housing (11).

10. The motor vehicle transmission according to claim 9, wherein the motor housing (9) of the first electrical motor (2) is integral with a first transmission cover (10) and the second motor housing (12, 24) is integral with a second transmission cover (13), the first transmission cover (10) and the second transmission cover (13) are each secured to the transmission housing (11) such that the first transmission cover (10) and the second transmission cover (13), respectively, enclose the first opening and the second opening in the transmission housing (11).

11. The motor vehicle transmission according to claim 9, wherein a selector shaft (5) is connected to and biased by the first electric motor (2) to engage a gear ratio on a transmission shaft (7) and the gear ratio to be engaged is selected by the second electrical motor (8).

12. The motor vehicle transmission according to claim 9, wherein the second transmission cover (13) is unitary with the second motor housing (12, 24).

13. The motor vehicle transmission according to claim 8, wherein the motor housing (9, 12, 24) of the electric motor (2, 8, 22) is secured to an exterior surface of the transmission housing (11).

* * * * *